US012653188B2

United States Patent

(12) United States Patent
Song et al.

(10) Patent No.: US 12,653,188 B2
(45) Date of Patent: Jun. 16, 2026

(54) COLOR-CHANGING SANITIZING COMPOSITIONS AND METHODS OF USE

(71) Applicant: Kimberly-Clark Worldwide, Inc., Neenah, WI (US)

(72) Inventors: Xuedong Song, Alpharetta, GA (US); Ning Yang, Suwanee, GA (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 0 days.

(21) Appl. No.: 18/683,404

(22) PCT Filed: Sep. 23, 2021

(86) PCT No.: PCT/US2021/051740
§ 371 (c)(1),
(2) Date: Feb. 13, 2024

(87) PCT Pub. No.: WO2023/048715
PCT Pub. Date: Mar. 30, 2023

(65) Prior Publication Data

US 2024/0381869 A1 Nov. 21, 2024

(51) Int. Cl.

| | |
|---|---|
| ***A01N 43/16*** | (2006.01) |
| ***A01N 25/34*** | (2006.01) |
| ***A01N 33/04*** | (2006.01) |
| ***A01N 43/50*** | (2006.01) |
| ***A01N 43/54*** | (2006.01) |
| ***A01P 1/00*** | (2006.01) |
| ***A01P 3/00*** | (2006.01) |

(52) U.S. Cl.

CPC ............. *A01N 43/16* (2013.01); *A01N 25/34* (2013.01); *A01N 33/04* (2013.01); *A01N 43/50* (2013.01); *A01N 43/54* (2013.01); *A01P 1/00* (2021.08); *A01P 3/00* (2021.08)

(58) Field of Classification Search

CPC ........ A01N 43/16; A01N 43/50; A01N 43/54; A01N 25/34; A01N 33/04; A61K 8/416; A61K 8/36; A61K 8/34; A61K 2800/45; C11D 3/40; C11D 3/48; C11D 3/2079; C11D 3/43; C11D 7/08; A01P 1/00; A01P 3/00; A61L 2/186; A61L 2/18; A61L 2101/32; A61Q 17/005
USPC ........................... 424/405, 400; 520/1; 512/1
See application file for complete search history.

(56) References Cited

U.S. PATENT DOCUMENTS

| | | | |
|---|---|---|---|
| 4,100,324 | A | 7/1978 | Anderson et al. |
| 4,298,649 | A | 11/1981 | Meitner |
| 4,463,780 | A | 8/1984 | Schultz et al. |
| 4,659,609 | A | 4/1987 | Lamers et al. |
| 4,833,003 | A | 5/1989 | Win et al. |
| 4,853,281 | A | 8/1989 | Win et al. |
| 5,064,635 | A | 11/1991 | Casey |
| 5,382,400 | A | 1/1995 | Pike et al. |
| 5,605,749 | A | 2/1997 | Pike et al. |
| 5,759,926 | A | 6/1998 | Pike et al. |
| 5,858,504 | A | 1/1999 | Fitting |
| 5,895,710 | A | 4/1999 | Sasse et al. |
| 6,315,114 | B1 | 11/2001 | Keck et al. |
| 7,399,608 | B2 | 7/2008 | MacDonald et al. |
| 8,772,184 | B2 | 7/2014 | Farrugia et al. |
| 8,772,185 | B2 | 7/2014 | Jelonek et al. |
| 8,871,232 | B2 | 10/2014 | Martin et al. |
| 9,170,205 | B2 | 10/2015 | Burns et al. |
| 2001/0037850 | A1 | 11/2001 | Marmon et al. |
| 2005/0125926 | A1 | 6/2005 | Rekum et al. |
| 2006/0222675 | A1 | 10/2006 | Sabnis et al. |
| 2006/0293205 | A1 | 12/2006 | Chung |
| 2008/0132438 | A1 | 6/2008 | Hoffman et al. |
| 2019/0343974 | A1 | 11/2019 | Jin et al. |

FOREIGN PATENT DOCUMENTS

| | | | | |
|---|---|---|---|---|
| EP | 1871844 B1 | 8/2014 | | |
| GB | 2510612 A | 8/2014 | | |
| JP | 5318612 B2 | 10/2013 | | |
| KR | 20200041494 A | 4/2020 | | |
| WO | WO-2008060355 A2 * | 5/2008 | ............. | A01N 25/00 |
| WO | WO2009001438 A1 | 12/2008 | | |
| WO | WO2011007286 A2 | 1/2011 | | |
| WO | WO2011012709 A2 | 2/2011 | | |

(Continued)

OTHER PUBLICATIONS

PCT Search Report Corresponding to Application No. PCT/US2021/051750 on Sep. 23, 2021.
Grainger, Rechargeable Sanitizer Indicator Towels, 150 ct., Box, Sheet Size 13-1/2 in x 18 in, 1 page.
European Search Report Corresponding to Application No. 21958561.9 on May 27, 2025.
Korean Office Action Corresponding to Application No. 10-2024-70127863 on Apr. 22, 2026.

*Primary Examiner* — Jessica Whiteley
(74) *Attorney, Agent, or Firm* — Dority & Manning, P.A.

(57) ABSTRACT

A sanitizing composition is provided. The sanitizing composition includes including 0.1 wt. % to about 10 wt. % of one or more antimicrobial, antifungal, and/or antiviral agents and 0.001 wt. % to about 10 wt. % of one or more volatile acids or volatile bases. The sanitizing composition includes 0.0001 wt. % to about 5 wt. % of one or more pH indicators having a color transition pH ranging from about 2 to about 6.5 or a pH indicator having a color transition ranging from about 7.5 to about 12. The sanitizing composition includes 80 wt. % to about 98 wt. % of one or more volatile solvents. Optionally, the sanitizing composition includes one or more additives. Porous, flexible, substrates pre-saturated with the sanitizing composition and methods of use are also provided.

22 Claims, No Drawings

(56) References Cited

FOREIGN PATENT DOCUMENTS

| | | | | |
|---|---|---|---|---|
| WO | WO2012075507 | A2 | 6/2012 | |
| WO | WO-2018065190 | A1 * | 4/2018 | ............. A01N 33/12 |

* cited by examiner

COLOR-CHANGING SANITIZING COMPOSITIONS AND METHODS OF USE

RELATED APPLICATIONS

The present application is the national stage entry of International Patent Application No. PCT/US2021/051740 having a filing date of Sep. 23, 2021, which is incorporated herein in its entirety by reference thereto.

BACKGROUND

Effective cleaning and disinfection is important in healthcare industries and households in order to reduce the risks of infections from a variety of pathogens. Often times, cleaning solutions or wipes pre-moistened with cleaning solutions including an antimicrobial agent and/or disinfectant are widely used for this purpose. However, to ensure effective disinfecting, the disinfectant must remain on the surface for the full contact time for the particular disinfectant according to manufacturer's instructions. Such contact time, also known as the wet time, is the time that the disinfectant needs to stay wet on the surface in order to ensure efficacy. Contact times for various disinfectants range from about 15 seconds to about 10 minutes. Accordingly, it is uniquely challenging for consumers to know the contact time and to ensure that the appropriate contact time has been met after application of the disinfectant. Shortened contact times can lead to ineffective cleaning, which does not adequately kill pathogenic material. Further, consumers can inadvertently shorten contact time by not applying enough disinfectant on the surface or by removing disinfectant is before it completely kills pathogenic microorganisms.

Accordingly, there is a need for improved cleaning solutions that provide a clear indication when a proper amount of contact time has occurred.

SUMMARY

In general, the present disclosure is directed to sanitizing compositions capable of changing color after a desired amount of contact time. One embodiment provided includes a sanitizing composition including 0.1 wt. % to about 10 wt. % of one or more antimicrobial, antifungal, and/or antiviral agents; 0.001 wt. % to about 10 wt. % of one or more volatile acids; 0.0001 wt. % to about 5 wt. % of one or more pH indicators having a color transition pH ranging from about 2 to about 6.5; 80 wt. % to about 98 wt. % of one or more volatile solvents; and optionally, one or more additives. The one or more volatile acids can include acetic acid, propylic acid, butyric acid, hydrochloric acid, low fatty acids such as heptanoic acid and hexanoic acid, or a combination thereof. The one or more pH indicators can include methyl red, propyl red, bromophenol blue, bromocresol green, bromocresol purple, congo red, bromothymol blue, or a combination thereof.

Another aspect of the present disclosure provides a sanitizing composition including 0.1 wt. % to about 10 wt. % of one or more antimicrobial, antifungal, and/or antiviral agents; 0.001 wt. % to about 10 wt. % of one or more volatile bases; 0.0001 wt. % to about 5 wt. % of one or more pH indicators having a color transition pH ranging from about 7.5 to about 12; 80 wt. % to about 98 wt. % of one or more volatile solvents; and optionally, one or more additives. The one or more volatile bases can include ammonium hydroxide, triethylamine, ethanolamine, triethanolamine, or a combination thereof. The one or more pH indicators can include alizarin red S, alizarin yellow, carvacrolphthalein, chrome orange GR, o-cresolphthalein, m-cresol purple, curcumin, dixylenolphthalein, guaiacophthalein, nile blue, thymolphthalein, xylenol blue, xylenolphthalein, or a combination thereof.

Also provided are pre-saturated, porous, flexible substrates including the sanitizing compositions disclosed herein and methods for using the sanitizing compositions or substrates.

Other features and aspects of the present disclosure are discussed in greater detail below.

DETAILED DESCRIPTION

It is to be understood by one of ordinary skill in the art that the present discussion is a description of exemplary embodiments only, and is not intended as limiting the broader aspects of the present disclosure.

As used herein the term "nonwoven" fabric or web means a structure of individual fibers or threads which are interlaid, but not in an identifiable manner as in a knitted or woven fabric. Nonwoven fabrics or webs have been formed by many processes such as, for example, meltblowing processes, spunbonding processes, hydroentangling, air-laid, and carding processes.

As used herein, the term "porous material" includes those materials having open areas or interstitial spaces located therein; the open areas or interstitial spaces need not extend through the entirety of the material.

The sanitizing compositions provided herein maybe referred to generally throughout as "compositions" and/or "formulations". Indeed, such terms may be used interchangeable to refer to the sanitizing compositions disclosed herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

The embodiments including compositions, substrates, and methods of the present disclosure, including components thereof, can comprise, consist of, or consist essentially of the essential elements and limitations of the embodiments described herein, as well as any additional or optional components or limitations described herein or otherwise useful.

The present disclosure is directed to sanitizing compositions, pre-saturated substrates containing the sanitizing compositions disclosed herein and methods for using the sanitizing compositions disclosed herein. The sanitizing compositions of the present disclosure include one or more volatile acids or volatile bases along with suitable pH indicators that are capable of changing color when the solution is substantially dried on the surface after a certain period of time. Accordingly, the sanitizing compositions provided herein can provide an indication of when an appropriate contact time has been achieved, thus alerting the user that the surface has been adequately sanitized.

Additionally, provided are flexible substrates that have been pre-saturated with the sanitizing composition as described herein. For example, the sanitizing solution can be applied to the substrate and, thus, the substrate has an original color. When the substrate remains the color as original, the substrate contains sufficient amounts of sanitizing composition and thus is considered to be effective. However, when the color of the substrate changes to a second color (e.g., due to drying), the substrate does not contain sufficient sanitizing composition and should be discarded. Accordingly, the substrates provided herein can provide a visual indication of whether or not a sufficient amount of sanitizing composition is present for effective cleaning and sanitizing.

Furthermore, as noted, the sanitizing compositions provided herein include combinations of volatile solvents and volatile acids and/or bases. Co-evaporation of either the volatile solvent and/or volatile acids or bases can trigger the color change for the composition, thus indicating both dryness and timing simultaneously. Advantageously, the amount or type of volatile solvent, base, and/or acid, can be modified in order to provide suitable color change when an appropriate contact time has been reached for the desired sanitizing agent. Thus, inclusion of the volatile solvents, bases, and/or acids can be adjusted and used according to the desired contact time for a particular sanitizing agent(s).

I. Sanitizing Agent

As noted, the sanitizing composition can include one or more sanitizing agents, which generally refer to any of an antimicrobial agent, and antifungal agent, and/or an antiviral agent. Indeed, the compositions can contain any combination of an antimicrobial agent, antifungal agent, and/or antiviral agent. For example, in certain embodiments, the composition can include each of an antimicrobial agent, antifungal agent, and antiviral agent, while in other embodiments the composition includes at least two of an antimicrobial agent, antifungal agent, or antiviral agent. Once selected, the antimicrobial agent, antifungal agent, and/or antiviral agent can be included in the desired weight percentage based on the sanitizing needs of the composition.

The amount of the antimicrobial agent, antifungal agent, or antiviral agent utilized in the sanitizing composition can generally vary depending on the relative amounts of the other components present within the composition. Typically, the antimicrobial agent, antifungal agent, or antiviral agent is present in the composition in an amount from about 0.01% to about 10% by weight, such as from about 0.1% to about 9% by weight, such as from about 1% to about 8% by weight, such as from about 2% to about 7% by weight, such as from about 3% to about 6% by weight, such as from about 4% to about 5% by weight.

a. Antimicrobial Agents

Suitable antimicrobial agents include any antimicrobial agent that is capable of killing and/or inhibiting the growth of microorganisms (e.g., gram negative and/or positive bacteria). Any suitable antimicrobial agent can be utilized in the present disclosure. In one particular embodiment, the antimicrobial agent includes at least one quaternary ammonium compound having the following formula:

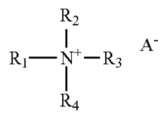

wherein, $R_1$, $R_2$, $R_3$, and $R_4$ are independently selected from the group consisting of H, $C_1$-$C_{30}$ alkyl, $C_1$-$C_{30}$ alkenyl, $C_1$-$C_{30}$ alkylethoxy, $C_1$-$C_{30}$ alkylphenolethoxy, etc.; and A is selected from the group consisting of halogens (e.g., chlorine, bromine, fluorine, etc.); methosulfates, phosphates, etc. For instance, some suitable quaternary ammonium compounds that may be used in present disclosure include, but are not limited to, benzalkonium chloride (BZK) or other benzalkonium halides, benzethonium chloride or other benzethonium halides, cetylpyridinium chloride, dequalinium chloride, N-myristyl-N-methyl-morpholinium methyl sulfate, poly-N-3-(dimethylammonio)propyl-N-3-(ethyleneoxyethelene dimethylammonio)propylurea dichloride, alpha-4-1-tris(2-hydroxyethyl)ammonium chloride-2-butenyl-omega-tris(2-hydroxyethyl)ammonium chloride, polyoxyethylene (dimethyliminio)ethylene(dimethyliminio)-ethylene dichloride.

In some embodiments, quaternary ammonium halide compounds having the following formula may be employed:

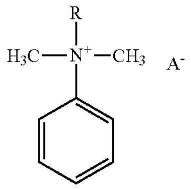

wherein,

R is a $C_8$-$C_{18}$ alkyl group; and

A is a halogen atom, such as chlorine, bromine, fluorine, etc.

One commercially available example of an antimicrobial agent that includes such a quaternary ammonium compound is available under the trade name BARDAC® 208M from Lonza, Inc., Allendale, N.J. Specifically, BARDAC® 208M contains a blend of alkyl dimethyl benzyl ammonium chlorides. Other commercially available examples of suitable quaternary ammonium compounds are believed to include BARDAC® 2050 and BARDAC® 2080 (based on dialkyl ($C_8$-$C_{10}$)dimethyl ammonium chloride); BARDAC® 2250 and BARDAC® 2280 (didecyl dimethyl ammonium chloride); BARDAC® LF and BARDAC® LF 80 (based on dioctyl dimethyl ammonium chloride); BARQUAT® MB-50 and BARQUAT® MB-80 (based on alkyl dimethyl benzyl ammonium chloride); BARQUAT® MX-50 and BARQUAT® MX-80 (based on alkyl dimethyl benzyl ammonium chloride); BARQUAT® OJ-50 and BARQUAT® OJ-80 (based on alkyl dimethyl benzyl ammonium chloride); BARQUAT® 4250, BARQUAT® 4280, BARQUAT® 4250Z, and BARQUAT® 4280Z (based on alkyl dimethyl benzyl ammonium chloride and/or alkyl dimethyl ethyl benzyl ammonium chloride); and BARQUAT® MS-100 (based on myristyl dimethyl benzyl ammonium chloride), which are available from Lonza, Inc. Suitable germicidal solutions containing such compounds are also commercially available, such as VIREX® II 128, which is sold by Diversey, Inc. and contains N-alkyl dimethyl benzyl ammonium chloride, didecyl dimethyl ammonium chloride, and ethanol. Still other solutions of blended quaternary ammonium compounds are available from Ecolab, Inc. of St. Paul, Minn. under the trade designation OASIS™ (e.g., OASIS™ 146).

In addition to quaternary ammonium compounds, other antimicrobial agents may also be utilized in the present disclosure. For instance, some suitable antimicrobial agents that may be utilized include, but are not limited to, alcohols, halogenated diphenyl ethers like 2,4,4'-trichloro-2'-hydroxy-diphenyl ether (Triclosan® or TCS) or 2,2'-dihydroxy-5,5'-dibromo-diphenyl ether; phenolic compounds like phenoxy-ethanol, phenoxy propanol, phenoxyisopropanol, para-chloro-meta-xylenol (PCMX), etc.; bisphenolic compounds, such as 2,2'-methylene bis(4-chlorophenol), 2,2'-methylene bis(3,4,6-trichlorophenol), 2,2'-methylene bis(4-chloro-6-bromophenol), bis(2-hydroxy-3,5-dichlorophenyl) sulphide, and bis(2-hydroxy-5-chlorobenzy-I) sulphide; halogenated carbanilides (e.g., 3,4,4'-trichlorocarbanilides (Triclocarban® or TOG); benzyl alcohols; chlorhexidine; chlorhexidine gluconate; and chlorhexidine hydrochloride. Other suitable antimicrobial agents are described in WO 96/06152; WO 96106153; and U.S. Pat. No. 6,201,695 to Beerse, et al. In addition, various other antimicrobial agents are set forth in Title 21, Section 178.010 of the United States Code of Federal Regulations (C.F.R.).

In certain embodiments, the antimicrobial agent can include gentamicin. Gentamicin, also known as Garamycin, Cidomycin, or Septopa, is an antibiotic that is active against a wide range of bacterias including gram-negative bacterias such as *Pseudomonas, Proteus, Escherichia coli, Kiebsiella pneumoniae, Enterobacter aerogenes, Serratia*, and also gram-positive *Staphylococcus*.

Additional suitable antimicrobial agents include compounds, molecules and chemical elements that are antimicrobial, including but not limited to, antibiotics, antiseptics or other antimicrobial compounds, silver, silver nanoparticles, ionic silver, combinations of one or more one silver compounds, other metals such as zinc, copper, gold, platinum, and their salts or complexes, for example, zinc undecylenate, isoniazid, ethambutol, pyrazinamnide, streptomycin, clofazimine, rifabutin, fluoroquinolones, ofloxacin, sparfloxacin, rifampin, azithromycin, clarithromycin, dapsone, tetracycline, erythromycin, ciprofloxacin, doxycycline, ampicillin, amphotericin B, ketoconazole, fluconazole, pyrimethamine, sulfadiazine, clindamycin, lincomycin, pentamidine, atovaquone, paromomycin, diclazaril, acyclovir, trifluorouridine, foscarnet, penicillin, ganciclovir, iatroconazole, miconazole, Zn-pyrithione, chlorohexidine, polyhexamethylene biguanides, polyhexamethylene biguanides, triclosan, iodine, iodine-polyvinyl pyrrolidone complex, urea-peroxide complex, benzalkonium salts, quaternary ammonium compounds based on saccharinate such as Onyxide (Stepan Chemical), turmeric extract, other natural anti-infective compounds and combinations thereof. Examples of antimicrobial agents suitable for use in the present disclosure are agents that can be dissolved or dispersed as fine particles or be present on or in inert supports. Polymeric antimicrobial compositions are also comprised by the present disclosure.

b. Antifungal Agents

Suitable antifungal agents include any agent that reduces or inhibits (e.g, kills) fungal growth. For example, antifungal agents of the present disclosure can be “fungistatic” and/or “fungicidal”. In certain embodiments, the antifungal agents include those that reduce or inhibit fungal growth by at least 10%. Any suitable antifungal agent can be utilized in the present disclosure.

In certain embodiments, the antifungal agent includes clotrimazole. Clotrimazole is an imidazole derivative having the following formula:

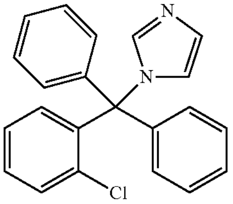 [SMILES: Clc1ccccc1C(c1ccccc1)(c1ccccc1)n1ccnc1]

Generally, clotrimazole is thought to work by inhibiting the growth of individual fungal cells by altering the permeability of the fungal cell wall. Clotrimazole is capable of binding to phospholipids in the cell membrane and can inhibit the biosynthesis of ergosterol and other sterols required for membrane production, thus resulting in slower fungal growth and/or cell death.

In certain embodiments, the antifungal agent includes terbinafine, also known as Lamisil. Terbinafine has the following formula:

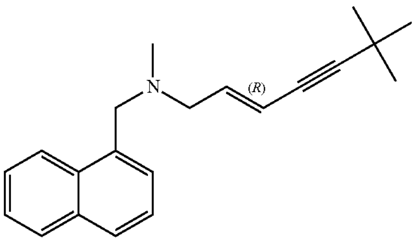

Terbinafine is a synthetic allylamine derivative with antifungal activity. Terbinafine inhibits squalene epoxidase, thereby blocking the biosynthesis of ergosterol, which is an important component of fungal cell membranes. As a result, Terbinafine prevents certain fungi from forming a protective outer layer, thus resulting in fungal cell death.

Additional anti-fungal agents include vinegar, borax, copper, 2-n-octyl-4-isothiazolin-3-one, grape oil, sunflower seed oil, chitinase E (family 19; class IV), grapefruit extract, indole alkaloid venenatine, silicon-containing derivatives of 2-aryl-3-(1H-1,2,4-triazol-1-yl)propanenltriles, o-carboranylalanine, and Polyphase CST (i.e., a non-metallic, water-dispersible liquid fungicide/mildewcide).

Other example anti-fungal agents include chlorine and chlorine compounds (e.g., sodium hypochlorite), iodine and iodine compounds, other halogen and halogen compounds (e.g., bromine), alcohols (e.g., IPA, ETOH, methanol), oxidants (e.g., hydrogen peroxide, peracetic acid), nitrogen compounds (e.g., thiazoles, mercatobenzothiazole, quinolines, anilides), quaternary ammonium compounds (e.g., benzalkonium chloride), phenolics (hydroxybenoic acid, chloroxylenol), acid-anionic compounds (e.g., alky aryl sulfonates) and organic acids (e.g., propionic, benzoic, lactic, citric, sorbic).

Some additional example anti-fungal agents include organic and inorganic mercurials, silver and silver compounds, other heavy metals (e.g., zinc, copper, nickel), cationic bisguanide, tryclosan, isothiazolin, chlorinated phenoxy, carbamates, 2-Dibromo-3-nitrilopropionamide, and a variety of natural compounds (e.g., terpene and aliphatic compounds).

c. Anti-Viral Agents

Suitable antiviral agents include any agent or combination of agents that are capable of killing and/or inhibiting the growth of viruses. Any suitable antiviral agent can be utilized in the present disclosure. In certain embodiments, the antiviral agent includes formivirsen. Formivirsen is an antisense oligonucleotide that specifically inhibits replication of human cytomegalovirus. Formiversen works by binding to complementary sequences on messenger RNA transcribed from the major immediate-early transcriptional unit of the virus.

In other embodiments, the antiviral composition can include brivudine. Brivudine is an analogue of the nucleoside thymidine having the following formula:

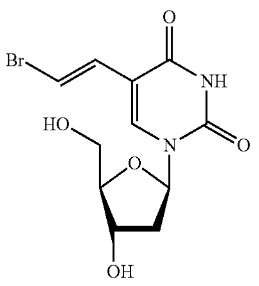 [SMILES: O=c1[nH]c(=O)n([C@H]2C[C@@H](O)[C@@H](CO)O2)cc1/C=C/Br]

Brivudine works by blocking the action of DNA polymerases, thus inhibiting viral replication.

Additional antiviral agents can include one or more carboxylic acids, such as citric acid, malic acid, succinic acid, benzoic acid, and the like. The one or more carboxylic acids may be utilized in combination with a surfactant in order to provide antiviral activity.

II. Volatile Acids or Volatile Bases

The sanitizing compositions can include one or more volatile acids or one or more volatile bases. For example, depending on the chemical composition and the pH indicator utilized, the composition will typically contain either volatile acids or volatile bases. For example, if a pH indicator having a color transition pH ranging from about 2 to about 6.5 is utilized, then one or more volatile acids can be utilized. If, however, the pH indicator includes a pH indicator having a color transition pH ranging from about 7.5 to about 12, then one or more volatile bases can be utilized.

When included, one or more volatile acids or volatile bases can be incorporated in an amount of from about 0.001 wt. % to about 10 wt. %, such as 0.01 wt. % to about 9.5 wt. %, such as 0.1 wt. % to about 9%, such as 1 wt. % to about 8.5 wt. %, such as 2 wt. % to about 8 wt. %, such as from about 3 wt. % to about 7.5 wt. %, such as from about 4 wt. % to about 7 wt. %, such as from about 5 wt. % to about 6 wt. %.

Suitable volatile acids include any acid that is capable of rapidly undergoing vaporization. Such rapid vaporization is a result of the acid having high vapor pressure at room temperature. Accordingly, volatile acids can undergo vaporization without heating or any other external force. Suitable volatile acids include acetic acid, propylic acid, butyric acid, hydrochloric acid, low fatty acids such as heptanoic acid and hexanoic acid or a combination thereof.

Suitable volatile bases include any base that is capable of rapidly undergoing vaporization. Suitable volatile bases include ammonium hydroxide, triethylamine, ethanolamine, triethanolamine, or a combination thereof.

III. pH Indicator

A suitable pH indicator is included in the sanitizing compositions provided herein. The pH indicator has a specific color transition pH according to certain pH ranges. The color change provided by the pH indicator can be from color to colorless, colorless to color, or from one color to another color. Furthermore, one or more pH indicators having visually different colors may be combined or pH indicators having the same visual color can be combined and included in the formulations provided herein.

The amount of pH indicator included can vary from about 0.0001 wt. % to about 2 wt. %, such as from about 0.001 wt. % to about 1.8 wt. %, such as from about 0.01 wt. % to about 1.6 wt. %, such as from about 0.1 wt. % to about 1.4 wt. %, such as from about 0.5 wt. % to about 1.2 wt. %, such as about 1.0 wt. %. The amount of pH indicator included can vary depending on the overall formulation of the composition and the desired amount of color change necessary.

As noted, the pH indicator includes a specific color transition pH where the pH indicator changes color as provided herein. In certain embodiments, the pH indicator has a color transition pH ranging from about 2 to about 6.5. Suitable pH indicators having a color transition pH in the acidic range would be suitable for inclusion in sanitizing compositions including one or more volatile acids. Examples of suitable pH indicators having a color transition pH in the acidic range include methyl red, propyl red, bromophenol blue, bromocresol green, bromocresol purple, congo red, bromothymol blue, or a combination thereof.

In certain embodiments, the pH indicator has a color transition pH ranging from about 7.5 to about 12. Suitable pH indicators having a color transition pH in the basic range would be suitable for inclusion in sanitizing compositions including one or more volatile bases. Examples of suitable pH indicators having a color transition pH in the basic range include alizarin red S, alizarin yellow, carvacrolphthalein, chrome orange GR, o-cresolphthalein, m-cresol purple, curcumin, dixylenolphthalein, guaiacophthalein, nile blue, thymolphthalein, xylenol blue, xylenolphthalein, or a combination thereof.

IV. Volatile Solvents

The sanitizing compositions of the present disclosure can include one or more volatile solvents. The volatile solvent included can be a single solvent or a mixture of solvents. Suitable solvents include water, ethanol, methanol, butanol, propanol, isopropanol, butanone, acetone, tetrahydrofuran, and combinations thereof. In making the color-changing compositions and substrates of the disclosure, the components may either be dissolved all together in the solvent(s) or sequentially dissolved to make homogenous solutions. Additionally, certain components of the sanitizing compositions can be suspended in the volatile solvent.

The volatile solvent can be present in an amount of from about 80 wt. % to about 98 wt. %, such as from about 82 wt. % to about 96 wt. %, such as from about 84 wt. % to about 94 wt. %, such as from about 86 wt. % to about 92 wt. %, such as from about 88 wt. % to about 90 wt. %.

V. Additives

The sanitizing compositions can include additional additives such as fragrances, colorants, foaming agents, viscosity modifiers, and combinations thereof. For example, a variety of fragrances can be utilized in the formulations provided herein. Fragrances known to those of skill in the art for use in sanitizing compositions can also be utilized accordingly.

Fragrances can include one or more aroma compounds and can optionally be mixed with an inert carrier. Aroma compounds usually include compounds described as having top notes, middle notes and/or base notes. Top note compounds are the least resistant to heating and will generally flash off or volatilize quickly upon exposure to elevated temperatures. Middle note compounds, also known as aldehydic lifters, are more stable and longer lasting, but are still prone to dissipation over a relatively short period of time or upon repeated exposure to elevated temperatures. Base note compounds are those compounds often characterized as having a "heavy" scent and are the most resistant to dissipation over time, lingering for long periods. One class of base note compounds includes essential oils. Generally, a fragrance may be made of from about 5% to about 50% aroma compounds. Typically, a fragrance may include from about 50% to about 95% inert carrier compounds. Suitable inert carrier compounds can include dipropylene glycol.

Preferably, the fragrance includes at least two aroma compounds. More preferably, the fragrance includes at least two aroma compounds each having at least one base note that is thermostable up to at least about 75° C. Most preferably, at least one of the aroma compounds is an essential oil. Suitable essential oils include ylang ylang, coriander, grapefruit, lavender, white thyme, mandarin orange oil, tuberose, jasmine, lavadin, galbanum, clove leaf, eucalyptus, and geraniol. Other essential oils suitable for use in the present disclosure include sandalwood, musk, orris root, jasmine, rose, lily of the valley, bergamot, orchid, ginger, nutmeg, lemongrass, tumeric, rosemary, clove, chamomile, achillea, thulasi and cedar. Additionally, other essential oils known in the art can also be used. Additional fragrances that can be used include limonene, pinene, menthol, camphor, and mixtures thereof.

As noted, in certain embodiments, the composition can include a suitable foaming agent. For example, the foaming agent is capable of causing the composition to foam when the composition is combined with air using, for instance, a suitable pump or spray dispenser. Although the sanitizing composition may be dispensed from an aerosol container, an aerosol is not needed in order to cause the composition to foam. Also of particular advantage, the sanitizing composition is foamable without having to include fluorinated surfactants. Various different derivatized dimethicone foaming agents may be used in the composition of the present disclosure. The derivatized dimethicone, for instance, may comprise a dimethicone copolyol, such as an ethoxylated dimethicone. In one embodiment, the derivatized dimethicone is linear, although branched dimethicones may be used.

Particular examples of dimethicone copolyols that may be used include polyoxyethylene glycol dimethicone containing from about 5 to about 20 moles of polyoxyethylene glycol. The derivatized dimethicone may be, for instance, PEG-10 dimethicone, PEG-12 dimethicone, or mixtures thereof. In one embodiment, the derivatized dimethicone may comprise a dimethicone copolyol ester. An example, for instance, of a dimethicone copolyol ester is dimethicone PEG-7 cocoate. The derivatized dimethicone may be present in the sanitizing composition in an amount sufficient to cause the composition to foam when combined with air.

Additional, viscosity modifiers (e.g., thickeners) can be added to the compositions provided herein to impart desired characteristics to the composition. Example viscosity modifiers that can be utilized include various modified celluloses. For instance, the viscosity modifier may comprise ethyl cellulose, hydroxypropyl cellulose, carboxymethyl cellulose, hydroxypropyl methyl cellulose, hydroxyethyl methyl cellulose, and combinations thereof. Other viscosity modifiers include natural gums, such as guar gum, carrageenan, gum Arabic, locust bean gum, xanthan gum, and mixtures thereof. Other various polymeric viscosity modifiers that may be used include a hydroxyethyl cellulose, a polyether propanoic acid TMX copolymer or an acrylate polymer such as an alkyl acrylate crosspolymer containing from about 10 carbon atoms to about 30 carbon atoms in the alkyl chain.

VI. Use of Sanitizing Compositions

The sanitizing compositions as described can be stored in a suitable dispensing container and can be dispensed from said container. As noted, the sanitizing composition can be applied to a surface. For example, the sanitizing composition can be sprayed on to a hard surface in need of sanitizing and/or disinfecting. Generally, the sanitizing composition remains wet on the hard surface once applied. After the sanitizing composition has changed color on the surface, the surface can be wiped to remove an residual material and/or sanitizing composition remaining thereon. Indeed, waiting to wipe the surface until after the color change has occurred, ensures an appropriate amount of contact time between the surface and the sanitizing agent ensuring appropriate disinfection.

The sanitizing compositions can be applied to any suitable surface for sanitizing and/or disinfecting. For example, in certain embodiments, a layer (e.g., a thin layer) of sanitizing composition can be sprayed onto the desired surface, while in other embodiments a layer of sanitizing composition can be wiped onto the desired surface.

As noted, in certain embodiments, the sanitizing composition can be pre-saturated on a porous, flexible substrate. For example, any suitable nonwoven-based wipes, cotton wipes, or woven fabric wipes can be pre-saturated with the sanitizing composition and used to apply the sanitizing composition to a surface. As noted, the sanitizing composition can be applied to a porous, flexible, substrate in order to form a cleaning article (e.g., cleaning wipe).

Exemplary porous materials include, but are not limited to, nonwoven webs, multilayer laminates, open cell foams, woven and knitted materials and so forth. The porous material can include individual openings or interstitial spaces that collectively form pathways through the thickness of the material via adjacent, inter-connecting spaces or openings. The sanitizing composition is desirably applied to the porous material in order to pre-moisten or saturate both the exterior and interior portions of the same. Further, the porous material is desirably a fibrous sheet having numerous interstitial spaces throughout the fabric. In a further aspect, the sanitizing compositions disclosed herein are also suitable for use within porous materials formed from and/or comprising a hydrophobic material. As used herein, the term "hydrophobic" includes those materials having a contact angle greater than 45 degrees.

However, many hydrophobic materials suitable for use in the present disclosure may have a contact angle of about 60 degrees or more and, still more desirably, may have a contact angle of about 90 degrees or more. Suitable hydrophobic materials include, but are not limited to, those formed from polyolefins, polyesters, polyamides and like polymers. As an example, the porous material may comprise propylene polymers. Exemplary nonwoven fabrics can be formed by many processes such as, for example, meltblowing processes, spunbonding processes, hydroentangling processes, air-laid processes, bonded carded web processes and so forth. In addition, the porous, material can comprise a multi-layer laminate of one or more different materials. By way of example only, materials suitable for use with the present disclosure include, but are not limited to, those described in U.S. Pat. No. 4,100,324 to Anderson et al.; U.S. Pat. No. 4,298,649 to Meitner; U.S. Pat. No. 4,463,780 to Hotchkiss et al.; U.S. Pat. No. 4,659,609 to Lamers et al; U.S. Pat. No. 4,853,281 to Abba et al.; U.S. Pat. No. 4,833,003 to Win et al.; U.S. Pat. No. 5,382,400 to Pike et al.; U.S. Pat. No. 5,895,710 to Sasse et al.; U.S. Pat. No. 5,605,749 to Pike et al.; U.S. Pat. No. 5,858,504 to Fitting; U.S. Pat. No. 5,759,926 to Pike et al., U.S. patent application Ser. No. 09/760,962 to Marmon et al. and U.S. patent application Ser. No. 09/531,300 to Keck et al.; the entire content of each of the aforesaid references is incorporated herein by reference. The size and shape of the porous material can vary as desired and will often be selected in accord with the nature of the surface to be cleaned.

Once applied to the desired substrate, the substrate can be stacked and stored for an extended period of time. Thus, stacked materials can be pre-moistened and then stored in a sealed container until needed. In this regard, wipers or sheets taken from the stack each contain the sanitizing composition as provided herein. Further, wipers contained throughout the stack desirably contain substantially the same amount of the sanitizing composition. In this regard the stack of sheets desirably experience insubstantial liquid migration over time and, in particular, avoids migration wherein the upper portion of the stack contains significantly less liquid relative to the amount of liquid within the lower portion of the stack. Thus, the sealed container can hold the pre-moistened sheets such that the stacked sheets, from top to bottom, each contain an effective amount of sanitizing composition even when experiencing extended storage and/or shipping times.

As used herein, the term "stack" is used broadly to include any collection of wipers or sheets wherein there is a plurality of surface-to-surface interfaces. This not only includes a vertically stacked collection of individual sheets, but also includes a horizontally stacked collection of individual sheets as well as a rolled or folded collection of continuous sheet material. In the case of a horizontal stack, where the individual sheets are standing on edge, the concentration of the cleaning composition is desirably maintained substantially equal from the top to the bottom of each individual sheet, as well as from sheet to sheet. A rolled or folded product comprising a continuous sheet desirably has perforated or over-bonded lines of weakness which allow separation into smaller individual sheets of a desired shape and size. Notably, when wound into a roll, the concentration of the cleaning composition within the roll of wipes or sheets equilibrates to substantially equal concentrations, regardless of the orientation of the roll within a container.

Furthermore, should one or more substrates (e.g., wipes) contained within the stack of the container become dry over time, the pH indicator will change the color of the substrate itself, indicated that the selected substrate does not include enough sanitizing composition and should be discarded. Advantageously, no matter the stacked arrangement of the substrates, the sanitizing composition pre-saturated thereon, is capable of indicating to an end user when the substrates are no longer suitable for use.

Furthermore, it should be noted that "applying" or "treating" surfaces as used herein is used the broad sense and includes, but is not limited to, wiping, polishing, swabbing, cleaning, washing, disinfecting, scrubbing, scouring, sanitizing, and/or applying active agents thereto. The sanitizing compositions or pre-moistened substrates of the present disclosure are also capable of removing foreign matter from various surfaces. By way of non-limiting examples, foreign matter includes substances such as oil, grease, ink, paint, tar, caulking and sealing compounds, adhesives and glues, coal dust, pitch, varnishes, and so forth. In addition, by way of example only, the sanitizing compositions and pre-saturated substrates are well suited to treating hard surfaces such as, for example, counters, tables, furniture, workstations, windows, lab tops, equipment, machinery, floors, walls and so forth. Suitable hard surfaces include metal, glass, wood, stone, plastic, and so forth.

The present disclosure may be further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

EXAMPLES

Percentages of components provided in the Examples disclosed herein are directed to weight percentages unless otherwise noted.

Example 1

Formulation 1 includes of the following components: 1% of benzethonium chloride, 0.02% of bromocresol green, 0.06% of acetic acid, 30% ethanol and 69% water. The solution is yellow. When the yellow solution is sprayed on a white ceramic surface or a white paper board surface, the formulation on those surfaces remained almost colorless or slightly yellowish. The surfaces became blue after drying.

Formulation 1 includes of the following components: 1% of benzethonium chloride, 0.02% of bromocresol green, 0.06% of acetic acid, 30% ethanol and 69% water. The solution is yellow. When the yellow solution is sprayed on a white ceramic surface or a white paper board surface, the formulation on those surfaces remained almost colorless or slightly yellowish. The surfaces became blue after drying.

Example 2

Formulation 2 includes of the following components: 2% of benzethonium chloride, 0.03% of bromophenol blue, 0.1% of acetic acid, 30% ethanol and 67.9% water. The solution is yellow. When the yellow solution is sprayed on a white ceramic surface or a white paper board surface, the formulation on those surfaces remained almost colorless or slightly yellowish. The surfaces became blue after drying.

Formulation 2 includes of the following components: 2% of benzethonium chloride, 0.03% of bromophenol blue, 0.1% of acetic acid, 30% ethanol and 67.9% water. The solution is yellow. When the yellow solution is sprayed on a white ceramic surface or a white paper board surface, the formulation on those surfaces remained almost colorless or slightly yellowish. The surfaces became blue after drying.

Example 3

Formulation 3 includes of the following components: 2.5% of benzethonium chloride, 0.05% of methyl red, 0.1% of acetic acid, 70% ethanol and 27.4% water. The solution is red. When the red solution is sprayed on a white ceramic surface or a white paper board surface, the formulation on those surfaces remained reddish. The surfaces became yellowish after drying.

Formulation 3 includes of the following components: 2.5% of benzethonium chloride, 0.05% of methyl red, 0.1% of acetic acid, 70% ethanol and 27.4% water. The solution is red. When the red solution is sprayed on a white ceramic surface or a white paper board surface, the formulation on those surfaces remained reddish. The surfaces became yellowish after drying.

Example 4

Formulation 4 includes of the following components: 1.7% (weight) of benzethonium chloride, 0.067% of p-xylenophthalein, 0.67% of triethanoamine, 6.7% ethanol and 91% water. The solution is blue.

When the blue solution is sprayed on a white ceramic surface or a white paper board surface, the formulation on those surfaces remained blue. The surfaces became colorless after drying.

Formulation 4 includes of the following components: 1.7% (weight) of benzethonium chloride, 0.067% of p-xylenophthalein, 0.67% of triethanoamine, 6.7% ethanol and 91% water. The solution is blue.

When the blue solution is sprayed on a white ceramic surface or a white paper board surface, the formulation on those surfaces remained blue. The surfaces became colorless after drying.

Example 5

Formulation 5 includes of the following components: 2.5% (weight) of benzethonium chloride, 0.09% of thymolphthalein, 1% of triethanoamine, 8% ethanol and 88.4% water. The solution is blue. When the blue solution is sprayed on a white ceramic surface or a white paper board surface, the formulation on those surfaces remained blue. The surfaces became colorless after drying.

Formulation 5 includes of the following components: 2.5% (weight) of benzethonium chloride, 0.09% of thymolphthalein, 1% of triethanoamine, 8% ethanol and 88.4% water. The solution is blue. When the blue solution is sprayed on a white ceramic surface or a white paper board surface, the formulation on those surfaces remained blue. The surfaces became colorless after drying.

Example 6

Formulation 6 includes of the following components: 2.5% (weight) of benzethonium chloride, 0.09% of thymolphthalein, 1% of ethanoamine, 8% ethanol and 88.4% water. The solution is blue. When the blue solution is sprayed on a white ceramic surface or a white paper board surface, the formulation on those surfaces remained blue. The surfaces became colorless after drying.

Formulation 6 includes of the following components: 2.5% (weight) of benzethonium chloride, 0.09% of thymolphthalein, 1% of ethanoamine, 8% ethanol and 88.4% water. The solution is blue. When the blue solution is sprayed on a white ceramic surface or a white paper board surface, the formulation on those surfaces remained blue. The surfaces became colorless after drying.

Example 7

Formulation 7 includes of the following components: 2% (weight) of benzethonium chloride, 0.1% of phenophthalein, 1% of triethanoamine, 6% ethanol and 90.9% water. The solution is pink. When the pink solution is sprayed on a white ceramic surface or a white paper board surface, the formulation on those surfaces remained pink. The surfaces became colorless after drying.

Formulation 7 includes of the following components: 2% (weight) of benzethonium chloride, 0.1% of phenophthalein, 1% of triethanoamine, 6% ethanol and 90.9% water. The solution is pink. When the pink solution is sprayed on a white ceramic surface or a white paper board surface, the formulation on those surfaces remained pink. The surfaces became colorless after drying.

Example 8

A piece of 6 cm×6 cm meltblown or hydroknit nonwoven material is soaked with 2 ml of Formulation 1 solution to show a yellowish color. The substrate gradually changed from yellow to blue when becoming substantially dry.

Example 9

A piece of 6 cm×6 cm meltblown or hydroknit nonwoven material is soaked with 2 ml of Formulation 4 solution to show a blue color. The substrate gradually changed from blue to colorless when becoming substantially dry.

Example 10

A piece of 6 cm×6 cm meltblown or hydroknit nonwoven material is soaked with 2 ml of Formulation 1 solution to show a yellowish color. The wipes were used to wipe a white ceramic surface or a white paper board surface. The surfaces showed blue color from almost colorless when the solution became substantially dry.

Example 11

A piece of 6 cm×6 cm meltblown or hydroknit nonwoven material is soaked with 2 ml of Formulation 4 solution to show a blue color. The wipes were used to wipe a white ceramic surface or a white paper board surface. The initial blue color from Formulation 4 became colorless when the solution became substantially dry.

These and other modifications and variations to the present disclosure may be practiced by those of ordinary skill in the art, without departing from the spirit and scope of the present disclosure, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the disclosure so further described in such appended claims.

What is claimed is:

1. A sanitizing composition, comprising:

0.1 wt. % to about 10 wt. % of one or more antimicrobial, antifungal, and/or antiviral agents, wherein at least one antimicrobial agent is present in the composition, the at least one antimicrobial agent including one or more quaternary ammonium compounds including benzethonium chloride and/or benzalkonium chloride, hydrogen peroxide, or a combination thereof;

0.001 wt. % to about 10 wt. % of one or more volatile acids;

0.0001 wt. % to about 5 wt. % of one or more pH indicators having a color transition pH ranging from about 2 to about 6.5;

80 wt. % to about 98 wt. % of one or more volatile solvents, wherein the sanitizing composition is a wet solution.

2. The sanitizing composition of claim 1, wherein the one or more antimicrobial, antifungal, and/or antiviral agents further includes chlorhexidine digluconate.

3. The sanitizing composition of claim 1, wherein the one or more antimicrobial, antifungal, and/or antiviral agents further includes gentamicin.

4. The sanitizing composition of claim 1, wherein the one or more antifungal agents comprise clotrimazole, terbinafine, or a combination thereof.

5. The sanitizing composition of claim 1, wherein the one or more antiviral agents comprise formivirsen, brivudine, or a combination thereof.

6. The sanitizing composition of claim 1, wherein the one or more volatile acids comprise acetic acid, propylic acid, butyric acid, hydrochloric acid, or a combination thereof.

7. The sanitizing composition of claim 1, wherein the one or more pH indicators comprise methyl red, propyl red, bromophenol blue, bromocresol green, bromocresol purple, congo red, bromothymol blue, or a combination thereof.

8. The sanitizing composition of claim 1, wherein the one or more volatile solvents comprise water, ethanol, propanol, isopropanol, acetone, butanone, or a combination thereof.

9. The sanitizing composition of claim 1 further comprising one or more additives, wherein the one or more additives comprise fragrances, colorants, foaming agents, viscosity modifiers, or a combination thereof.

10. A sanitizing composition, comprising:

0.1 wt. % to about 10 wt. % of one or more antimicrobial, antifungal, and/or antiviral agents, wherein at least one antimicrobial agent is present in the composition, the at least one antimicrobial agent including one or more quaternary ammonium compounds including benzethonium chloride and/or benzalkonium chloride, hydrogen peroxide, or a combination thereof;

0.001 wt. % to about 10 wt. % of one or more volatile bases;

0.0001 wt. % to about 5 wt. % of one or more pH indicators having a color transition pH ranging from about 7.5 to about 12, wherein the one or more pH indicators comprise alizarin red S, alizarin yellow, carvacrolphthalein, chrome orange GR, o-cresolphthalein, m-cresol purple, curcumin, dixylenolphthalein, guaiacophthalein, nile blue, thymolphthalein, xylenol blue, xylenolphthalein, or a combination thereof, 80 wt. % to about 98 wt. % of one or more volatile solvents; and optionally, one or more additives.

11. The sanitizing composition of claim 10, wherein the one or more antimicrobial, antifungal, and/or antiviral agents further includes chlorhexidine digluconate.

12. The sanitizing composition of claim 10, wherein the one or more antimicrobial, antifungal, and/or antiviral agents further includes gentamicin.

13. The sanitizing composition of claim 10, wherein the one or more antifungal agents comprise clotrimazole, terbinafine, or a combination thereof.

14. The sanitizing composition of claim 10, wherein the one or more antiviral agents comprise formivirsen, brivudine, or a combination thereof.

15. The sanitizing composition of claim 10, wherein the one or more volatile bases comprise ammonium hydroxide, triethylamine, ethanolamine, triethanolamine, or a combination thereof.

16. The sanitizing composition of claim 10, wherein the one or more volatile solvents comprise water, ethanol, propanol, isopropanol, acetone, butanone, or a combination thereof.

17. The sanitizing composition of claim 10, wherein the one or more additives comprise fragrances, colorants, foaming agents, viscosity modifiers, or a combination thereof.

18. A pre-saturated, porous, flexible substrate that is pre-saturated with the sanitizing composition according to claim 1.

19. The pre-saturated, porous, flexible substrate of claim 18, wherein the substrate includes nonwoven-based wipes, cotton wipes, or woven fabric wipes.

20. The substrate of claim 19, wherein a color change of the substrate from a first color to a second color indicates that the substrate should not be used.

21. A method of using the sanitizing composition of claim 1, comprising:

applying the sanitizing composition to a surface; and after the sanitizing composition has changed color on the surface, wiping the surface to remove any residual material and/or sanitizing composition remaining thereon.

22. A method of using the pre-saturated, porous, flexible substrate of claim 19, comprising:

wiping a surface with the pre-saturated, porous, flexible substrate to cover the surface with a layer of the sanitizing composition pre-loaded on the wipe; and after the sanitizing composition has changed color on the surface, wiping the surface to remove any residual material and/or sanitizing composition remaining thereon.

* * * * *